United States Patent
Park

(10) Patent No.: US 7,385,647 B2
(45) Date of Patent: Jun. 10, 2008

(54) HOUSING COVER FOR IMAGE PHOTOGRAPHING APPARATUS

(75) Inventor: Cheul-hae Park, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 634 days.

(21) Appl. No.: 11/058,291

(22) Filed: Feb. 16, 2005

(65) Prior Publication Data
US 2005/0200755 A1 Sep. 15, 2005

(30) Foreign Application Priority Data
Mar. 10, 2004 (KR) .................. 10-2004-0016086

(51) Int. Cl.
H04N 5/225 (2006.01)
G03B 17/24 (2006.01)
G03B 17/02 (2006.01)

(52) U.S. Cl. ............... 348/376; 396/319; 396/424; 396/540

(58) Field of Classification Search .......... 348/373, 348/375, 376, 231.7; 396/277, 319, 321, 396/374, 424, 419, 535, 536, 540, 541; D16/202, D16/206
See application file for complete search history.

(56) References Cited

U.S. PATENT DOCUMENTS

| | | | | |
|---|---|---|---|---|
| 3,240,143 A * | 3/1966 | Koeber, Jr. et al. | ......... | 396/424 |
| 5,469,271 A * | 11/1995 | Hoshino et al. | ............ | 348/375 |
| 5,515,174 A * | 5/1996 | Abe et al. | .................... | 348/376 |
| 5,530,476 A * | 6/1996 | Morikawa et al. | .......... | 348/375 |
| 5,539,463 A * | 7/1996 | Morikawa et al. | .......... | 348/375 |
| 5,548,334 A * | 8/1996 | Ichiyoshi | .................... | 348/375 |
| 5,657,083 A * | 8/1997 | Kawase et al. | ............. | 348/373 |
| 5,729,291 A * | 3/1998 | Tanaka et al. | .............. | 348/373 |
| 5,822,001 A * | 10/1998 | Morikawa et al. | .......... | 348/375 |
| 6,169,579 B1 * | 1/2001 | Tsunekawa | ................. | 348/375 |
| 6,796,727 B2 * | 9/2004 | Tanabe | ....................... | 396/535 |
| 6,967,681 B2 * | 11/2005 | Hanzawa | .................... | 348/375 |
| 7,192,204 B2 * | 3/2007 | Koide et al. | ................ | 348/376 |
| 2004/0051811 A1 * | 3/2004 | Nakanishi | .................... | 348/375 |
| 2005/0140823 A1 * | 6/2005 | Ishikuro | ..................... | 348/375 |
| 2005/0200739 A1 * | 9/2005 | Ahn | ...................... | 348/333.06 |

(Continued)

FOREIGN PATENT DOCUMENTS

JP 04134782 A * 5/1992

(Continued)

Primary Examiner—John M. Villecco
(74) Attorney, Agent, or Firm—Roylance, Abrams, Berdo & Goodman, L.L.P.

(57) ABSTRACT

A housing cover of an image photographing apparatus has a main body mounting therein a deck for recording and reproducing information on an image input through a camera unit and a circuit board. A housing is openably hinged on one side of the deck to mount and separate an image recording medium to and from the deck. A door encloses an outside of the housing and is formed on one side of an outer casing of the main body. The door includes a groove part engaged with the housing by a plurality of screws. The groove part is provided with a hand grip for concealing the screws exposed to the outside and forming a grip part for a user to grip. Accordingly, gripability for carriage and use, and an aesthetic appearance of the image photographing apparatus are improved.

17 Claims, 3 Drawing Sheets

U.S. PATENT DOCUMENTS

| | | | |
|---|---|---|---|
| 2005/0200753 A1* | 9/2005 | Lee et al. | 348/376 |
| 2005/0200756 A1* | 9/2005 | Park et al. | 348/376 |
| 2006/0098976 A1* | 5/2006 | Takahashi et al. | 396/535 |
| 2006/0238644 A1* | 10/2006 | Lee | 348/373 |
| 2007/0126925 A1* | 6/2007 | Masuda et al. | 348/375 |
| 2007/0140683 A1* | 6/2007 | Tsujimoto | 396/374 |
| 2007/0153120 A1* | 7/2007 | Kajikawa et al. | 348/373 |
| 2007/0285517 A1* | 12/2007 | Ishikuro et al. | 348/207.99 |

FOREIGN PATENT DOCUMENTS

| | | | |
|---|---|---|---|
| JP | 2004077980 A | * | 3/2004 |
| JP | 2006047857 A | * | 2/2006 |
| KR | 1990-008323 | | 6/1990 |
| KR | 1996-001045 | | 5/1994 |
| KR | 1998-016290 | | 6/1998 |
| KR | 2000-013501 | | 7/2000 |

* cited by examiner

HOUSING COVER FOR IMAGE PHOTOGRAPHING APPARATUS

CROSS-REFERENCE TO RELATED APPLICATIONS

This application claims the benefit under 35 U.S.C. § 119(a) of Korean Patent Application No. 2004-16086, filed Mar. 10, 2004, in the Korean Intellectual Property Office, the entire disclosure of which is hereby incorporated by reference.

BACKGROUND OF THE INVENTION

1. Field of the Invention

The present invention relates to a portable image photographing apparatus, such as a camcorder. More particularly, the present invention relates to a housing cover openably mounted on a main body of an image photographing apparatus to allow insertion and removal of an image recording medium, such as a tape cassette, with respect to the image photographing apparatus.

2. Description of the Related Art

Recently, portable image photographing apparatuses have been increasing in popularity for photographing many events and leisure activities. As digital technology has developed, digital images have been widely used, and therefore, digital cameras and digital camcorders have been replacing analog products.

FIG. 1 illustrates a camcorder, which is an example of conventional image photographing apparatuses. The camcorder is well known for its functions of recording, reproducing and editing desired image information by integrating functions of a tape recorder and a camera. As shown in FIG. 1, the camcorder has a camera unit 110 for inputting information on an image of an object, a main body 120 for mounting a deck unit (not shown) for driving a recording medium that records and reproduces the input image information and a circuit board, and a liquid crystal (LC) monitor 130 for viewing the status of the image information input through the camera unit 110.

The above-structured image photographing apparatus usually uses a magnetic tape as the recording medium. A housing cover 140 is generally openable upwardly or downwardly and formed on one side of an outer casing of the main body 120 to permit insertion or removal of a tape cassette (not shown) into the deck unit (not shown) that is built in the outer casing of the main body 120.

The general and conventional image photographing apparatuses are manufactured in a small size for portability, and the outer casing of the main body 120 and the housing cover 140 are made of synthetic resin by an injection molding. Therefore, when a user grips the image photographing apparatus to carry or operate, the user's fingers frequently slip off, thereby causing inconvenience and unstableness in use.

SUMMARY OF THE INVENTION

Accordingly, an aspect of the present invention is to provide a housing cover of an image photographing apparatus that improves gripability and stability in carrying and using, and also improves its aesthetic appearance by concealing screws that are inevitably exposed when constructing such a small apparatus.

A housing cover of an image photographing apparatus has a main body mounting therein a deck for recording and reproducing information on an image input through a camera unit and a circuit board. A housing is openably hinged on one side of the deck to insert and separate an image recording medium to and from the deck. A door encloses an outside of the housing and is formed on one side of an outer casing of the main body. The door includes a groove part engaged with the housing by a plurality of screws, and the groove part is provided with a hand grip for concealing the screws exposed to the outside and forming a grip part for a user to grip.

The hand grip and the door are formed to have surfaces of different roughness.

The hand grip is made of a rubbery material.

The housing and the door are opened and closed forwardly with respect to the main body, and the image recording medium is inserted in the deck in a direction from a substance lens to an ocular lens, and withdrawn from the deck in a direction from the ocular lens to the substance lens.

Other objects, advantages and salient features of the invention will become apparent from the following detailed description, which, taken in conjunction with the annexed drawings, discloses preferred embodiments of the invention.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings, like reference numerals will be understood to refer to like parts, components and structures.

DETAILED DESCRIPTION OF EXEMPLARY EMBODIMENTS

Hereinafter, an exemplary embodiment of a housing cover according to the present invention will be described in detail with reference to the accompanying drawing figures.

The matters defined in the description, such as a detailed construction and elements thereof, are provided to assist in a comprehensive understanding of the invention. Thus, it is apparent that the present invention may be carried out without those defined matters. Also, well-known functions or constructions are not described in detail for conciseness and clarity.

Figure 1:
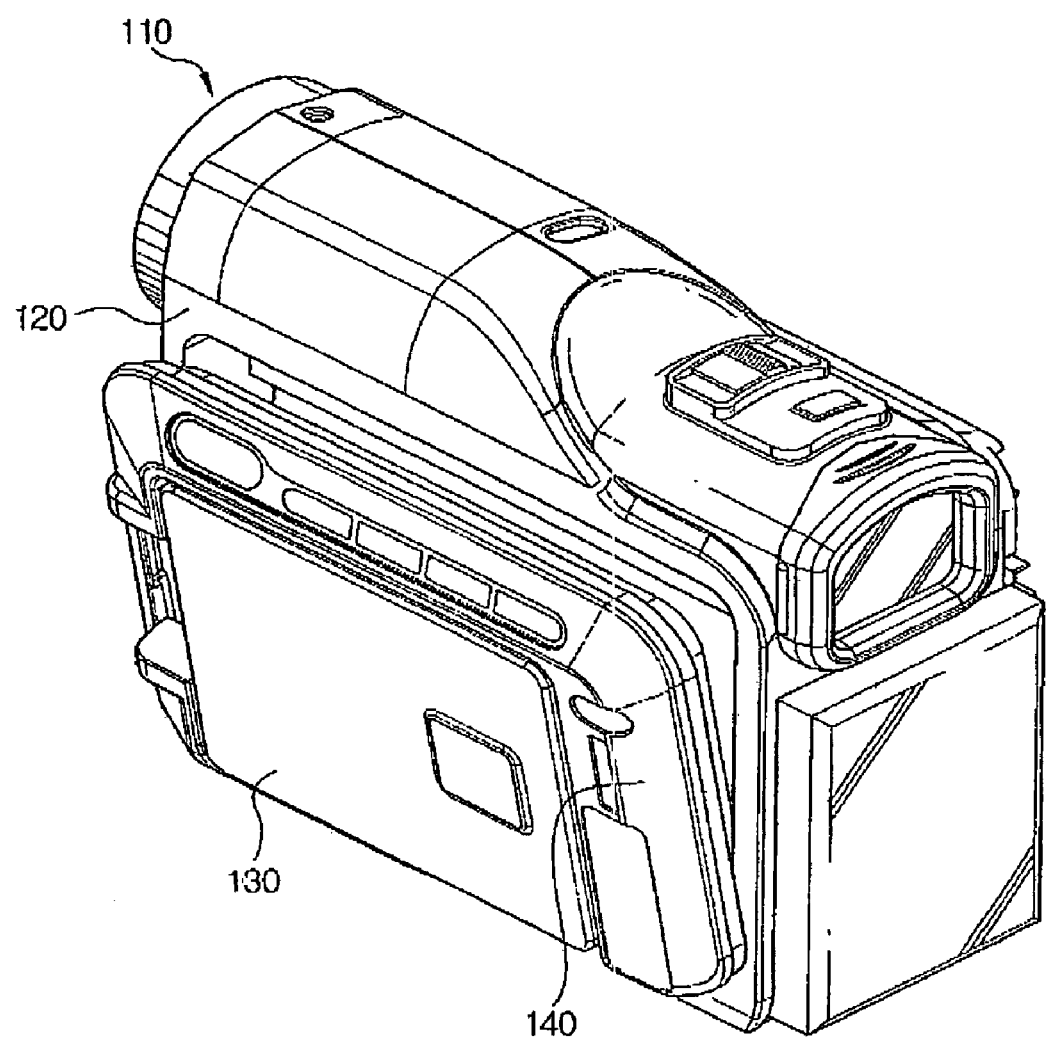
FIG. 1 is a perspective view schematically showing an appearance of a camcorder as an example of general conventional image photographing apparatuses.
Figure 2:
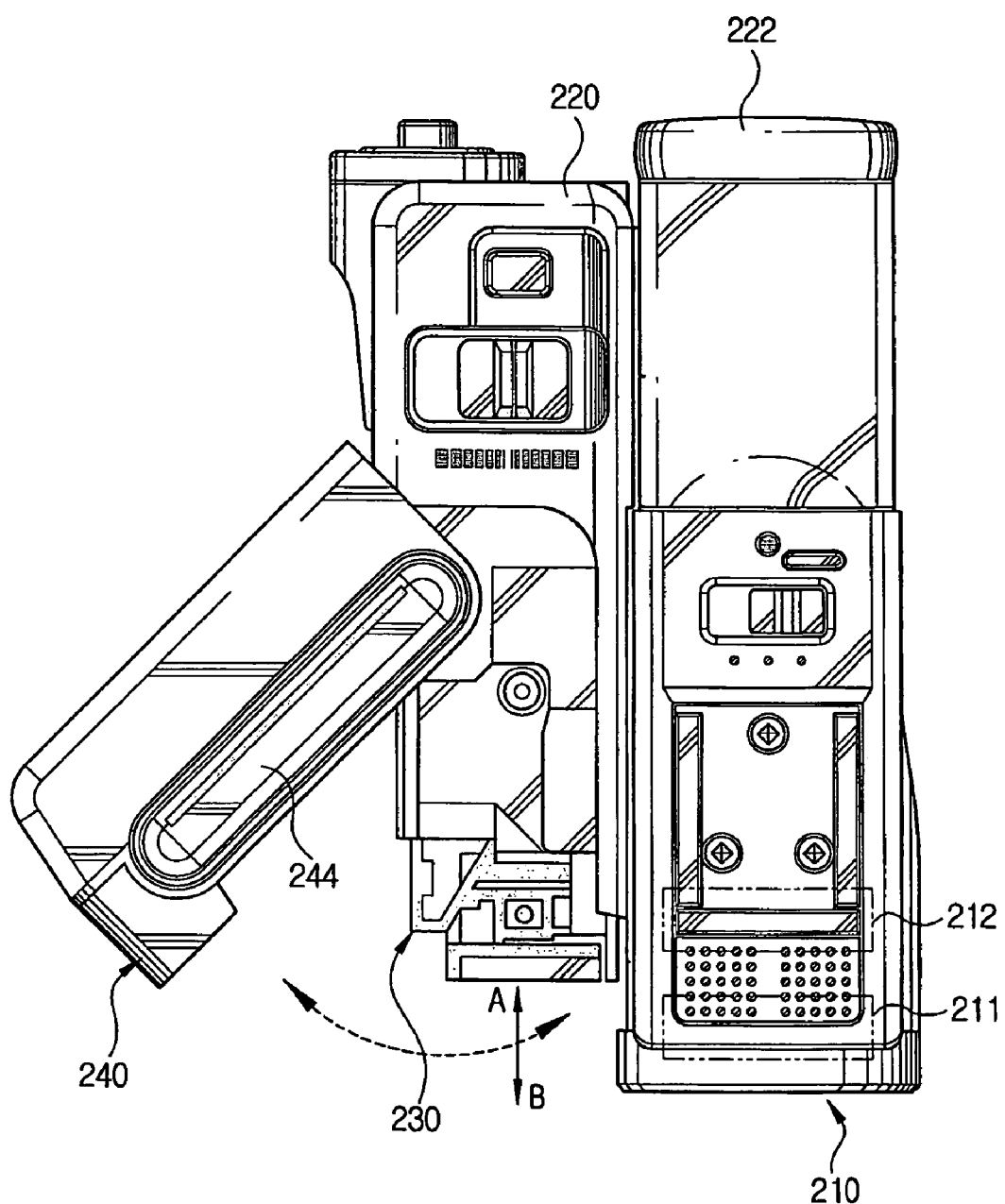
FIG. 2 is a top plan view schematically showing an appearance of a camcorder as an example of image photographing apparatuses employing a housing cover according to an embodiment of the present invention.
Figure 3:
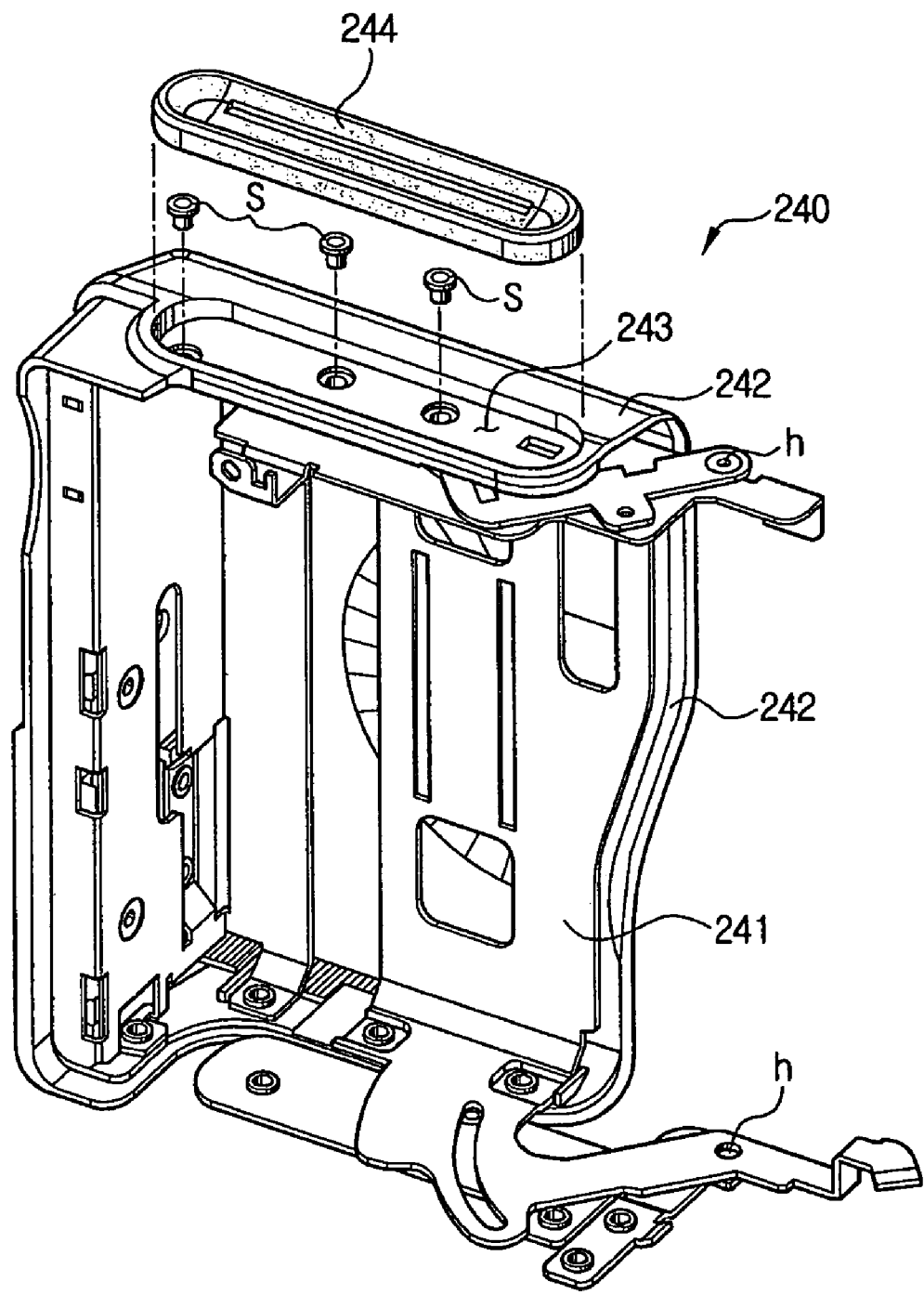
FIG. 3 is an exploded and perspective view schematically showing the housing cover of FIG. 2.

FIG. 2 is a plan view schematically showing a camcorder as an exemplary image photographing apparatus that employs a housing cover according to an embodiment of the present invention. FIG. 3 is an exploded and perspective view of the housing cover of FIG. 2. The housing cover of an image photographing apparatus, according to an embodiment of the present invention, opens and closes on a front of the apparatus, thereby facilitating construction of an image photographing apparatus having a minimal size, especially, having a minimal width.

Referring to FIG. 2, a housing cover 240 of an image photographing apparatus according to an embodiment of the present invention, is openably mounted on a front of the apparatus and formed on one side of an outer casing of a main body 220 in which a deck unit 230 and a circuit board (not shown) are built in. The deck unit 230 drives a recording medium for recording and reproducing image information on an object, which is input through a camera unit 210.

The camera unit 210 has a substance lens 211 and an ocular lens 212 arranged in order from a front of the main body 220. A view finder 222 is provided at a rear portion of the main body 220.

The recording medium inserted in the deck unit 230 may be a tape cassette having a magnetic tape.

As shown in FIG. 3, the housing cover 240 includes a housing 241 hinged on one side of the deck unit 230 and made of a metal frame. The housing cover 240 is hinged to the main body 210 by hinges h, as shown in FIG. 3. A door 242 is fastened by a plurality of screws S and is preferably made by an injection molding to enclose an outside of the housing 241 and to form a part of an outer casing of the main body 220.

The door 242 has a groove part 243 of a substantially oval shape for connection with the metal-framed housing 241. The door 242 is engaged with the housing 241 by the screws S in a manner that a bottom of the groove part 243 contacts with an outer surface of the housing 241.

The housing 241 and the door 242 are opened and closed with respect to the front of the main body 220. When the housing cover 240 is open, the tape cassette is inserted from the substance lens 211 of the camera unit 210 toward the ocular lens 212, that is, in the direction indicated by arrow 'A' in FIG. 2, and received in the deck unit 230. The tape cassette is removed from the deck unit 230 in the direction indicated by arrow 'B', which is from the ocular lens 212 of the camera unit 210 toward the substance lens 211.

A hand grip 244 shaped corresponding to the groove part 243 is forcibly fit into the groove part 243 of the door 242. The hand grip 244, which is one of distinctive features of the present invention, may be formed of rubbery material, such as urethane, to generate proper friction, thereby preventing the user's hand from slipping.

As the housing 241 and the door 242 are constructed to open and close forward with respect to the main body 220 to minimize the size of the apparatus, the screws S are inevitably exposed to the bottom of the groove part 243, and this may cause an unpleasant view. Here, the hand grip 244 functions as a cover for covering up the exposed screws S. Furthermore, since the grooved portion of the hand grip 244 allows a user's fingers to be safely received therein, gripability and stability are improved when the user carries and uses the image photographing apparatus.

As may be appreciated from the above description, the housing cover of the image photographing apparatus, according to an embodiment of the present invention, improves gripability for carriage and use and also improves an appearance of the image photographing apparatus. Also, these features may be employed in other compact-sized devices, enhancing operational convenience.

While the invention has been shown and described with reference to certain embodiments thereof, it will be understood by those skilled in the art that various changes in form and details may be made therein without departing from the spirit and scope of the invention as defined by the appended claims.

What is claimed is:

1. A housing cover of an image photographing apparatus, comprising:
   a main body mounting therein a deck for recording and reproducing information on an image input through a camera unit and a circuit board;
   a housing openably hinged to the main body to provide access to the deck to insert and remove an image recording medium;
   a door enclosing an outside of the housing and constructing one side of an outer casing of the main body; and
   a groove part in the door engaged with the housing by a plurality of fasteners, the groove part being provided with a hand grip to conceal the fasteners exposed to the outside and forming a grip part for a user to grip.

2. The housing cover of claim 1, wherein
   the housing is movable between a first closed position and a second open position.

3. The housing cover of claim 2, wherein
   an image recording medium is insertable to and removable from the deck when the housing is in the second position.

4. The housing cover of claim 1, wherein
   the hand grip and the door are formed to have surfaces of different roughness.

5. The housing cover of claim 1, wherein
   the hand grip is made of rubbery material.

6. The housing cover of claim 3, wherein
   the housing and the door are opened and closed forward with respect to the main body.

7. The housing cover of claim 6, wherein
   a substance lens and an ocular lens are disposed in the main body.

8. The housing cover of claim 7, wherein
   the substance lens is disposed rearwardly of the ocular lens.

9. The housing cover of claim 8, wherein
   the image recording medium is inserted in the deck in a first direction from the substance lens to the ocular lens, and the image recording medium is removed in a second direction from the ocular lens to the substance lens.

10. An image photographing apparatus, comprising:
    a main body;
    a deck disposed in the main body to record and reproduce information on an image recording medium received therein;
    a housing hinged to the main body to provide access to the deck to insert and remove the image recording medium, the housing being movable between a first closed position and a second open position;
    a door enclosing an outside of the housing and forming one side of an outer casing of the main body; and
    a groove part in the door engaged with the housing by a plurality of fasteners, the groove part being provided with a hand grip to conceal the fasteners and to form a grip part for a user to grip.

11. The housing cover of claim 10, wherein
    an image recording medium is insertable to and removable from the deck when the housing is in the second position.

12. The housing cover of claim 10, wherein
    the hand grip and the door are formed to have surfaces of different roughness.

13. The housing cover of claim 10, wherein
    the hand grip is made of rubbery material.

14. The housing cover of claim 10, wherein the housing and the door are opened and closed forward with respect to the main body.

15. The housing cover of claim 10, wherein a substance lens and an ocular lens are disposed in the main body.

16. The housing cover of claim 15, wherein the substance lens is disposed rearwardly of the ocular lens.

17. The housing cover of claim 16, wherein the image recording medium is inserted in the deck in a first direction from the substance lens to the ocular lens, and the image recording medium is removed in a second direction from the ocular lens to the substance lens.

* * * * *